(12) United States Patent
Reusch

(10) Patent No.: US 12,740,507 B2
(45) Date of Patent: Sep. 22, 2026

(54) METHOD AND SYSTEM FOR PROVIDING A FERTILIZER RECOMMENDATION AND A MEASUREMENT REGION AND LOCATION

(71) Applicant: Yara International ASA, Oslo (NO)

(72) Inventor: Stefan Reusch, Dülmen (DE)

(73) Assignee: YARA INTERNATIONAL ASA, Oslo (NO)

( * ) Notice: Subject to any disclaimer, the term of this patent is extended or adjusted under 35 U.S.C. 154(b) by 447 days.

(21) Appl. No.: 18/281,014

(22) PCT Filed: Mar. 14, 2022

(86) PCT No.: PCT/EP2022/056462
§ 371 (c)(1),
(2) Date: Sep. 8, 2023

(87) PCT Pub. No.: WO2022/194741
PCT Pub. Date: Sep. 22, 2022

(65) Prior Publication Data

US 2024/0138291 A1 May 2, 2024

(30) Foreign Application Priority Data

Mar. 15, 2021 (EP) .................................... 21162510

(51) Int. Cl.
*A01C 21/00* (2006.01)
*A01G 7/00* (2006.01)

(52) U.S. Cl.
CPC .......... *A01C 21/007* (2013.01); *A01C 21/005* (2013.01); *A01G 7/00* (2013.01)

(58) Field of Classification Search
CPC ........ A01C 21/007; A01C 21/005; A01G 7/00
See application file for complete search history.

(56) References Cited

U.S. PATENT DOCUMENTS 7,746,452 B2 6/2010 Fuchigami
10,175,215 B2 1/2019 Ozcan
(Continued)

FOREIGN PATENT DOCUMENTS

CA 2663917 C 12/2014
CN 108575240 A * 9/2018 .......... A01C 21/005
WO 2021/122962 A1 6/2021

OTHER PUBLICATIONS

Nutini, Francesco, et al. "An operational workflow to assess rice nutritional status based on satellite imagery and smartphone apps." Computers and Electronics in Agriculture 154 (2018): 80-92.
(Continued)

*Primary Examiner* — Christian T Bryant
(74) *Attorney, Agent, or Firm* — DILWORTH IP, LLC

(57) ABSTRACT

A system and method for providing a fertilizer recommendation for an agronomic field based on a direct measurement of a crop nutrient level at a measurement location, including receiving field and remote data. Optional approaches include adjusting the fertilizer recommendation based on at least one of the received field, farm and/or weather data. Alternatively, based on field data, at least one measurement region for carrying out a measurement for providing a fertilizer recommendation is determined. Optional approaches include receiving remote data, farm data and/or weather data to manage the improve the measurement region determination.

23 Claims, 9 Drawing Sheets

(56) References Cited

U.S. PATENT DOCUMENTS

| | | | |
|---|---|---|---|
| 2007/0218556 | A1 | 9/2007 | Harris et al. |
| 2011/0295638 | A1 | 12/2011 | Hunt et al. |
| 2012/0101634 | A1 | 4/2012 | Lindores |
| 2018/0035605 | A1 | 2/2018 | Guan |
| 2018/0046735 | A1 | 2/2018 | Xu et al. |
| 2020/0045898 | A1 | 2/2020 | Arriaza et al. |
| 2021/0350478 | A1* | 11/2021 | Ethington .............. G06Q 50/02 |
| 2022/0015308 | A1 | 1/2022 | Hassanzadeh et al. |

OTHER PUBLICATIONS

Extended European Search Report issued in App. No. EP21162510, dated Sep. 13, 2021, 15 pages.
International Preliminary Report on Patentability issued in App. No. PCT/EP2022/056462, mailing date Mar. 17, 2023, 20 pages.

* cited by examiner 310
320
20
330
330
300
135
40
30
40

METHOD AND SYSTEM FOR PROVIDING A FERTILIZER RECOMMENDATION AND A MEASUREMENT REGION AND LOCATION

TECHNICAL FIELD

The present disclosure relates to a system and method for determining a plant status and providing a fertilizer recommendation to crops in agricultural fields. The present disclosure relates also to the determination of suitable locations for measurements which allow the fertilizer recommendation.

BACKGROUND

Determining the appropriate amount of fertilizer a crop needs is one of the most important decisions a farmer will encounter. A deficit in nitrogen will reduce yield, while an excess will produce economic losses and damage the environment. A deficit in other nutrients will lead to crop defects and reduced crop quality. Crops, however, present an in-field variability due to the variance in parameters which influence the growth and development of a crop (water, soil properties) and is therefore cumbersome to establish a fertilizer recommendation which might suit the whole crop at optimum levels.

Handheld devices for direct measurement of crop nitrogen levels are well known in the prior art. Some of these devices usually determine the chlorophyll (directly related to nitrogen content) by means of optical measurements. However, these devices can only determine the plant status of a single plant each time, therefore rendering the determination of variable rate application of fertilizers difficult. While there are several approaches for non-direct determination of the nitrogen content in plants (N-Sensor®, Greenseeker®), wherein the sensing devices are integrated in agricultural machines which can be transported continuously over the field, reaching a full determination of the crop status over the whole field, these solutions are expensive and therefore not suitable for smallholders. Hence a low-cost approach is needed which makes a variable determination of the crop nutrition status over a whole field.

PRIOR ART

U.S. Pat. No. 7,746,452 B2 shows a device for measuring a plant chlorophyll, nitrogen and water levels, comprising a PDA which allows the determination of the measurement location. However, the approach in U.S. Pat. No. 7,746,452 B2 merely registers and displays the location data to the user to spot differences in results (e.g. for a shaded hillside).

U.S. Pat. No. 10,175,215 B2 discloses a different detecting device but a similar approach regarding the usage of GPS data. It merely highlights the advantages for spatio-temporal mapping, tracking and analysis of the results for further processing after the measurements have been carried out.

Several other devices like the SPAD meter (produced by Minolta) or the N-Tester of Yara International ASA have been successfully used for nitrogen recommendations. The SPAD-502Plus by Konica Minolta is a portable measuring device for chlorophyll content of leaves. SPAD-502Plus determines the relative amount of chlorophyll present by measuring the absorbance of the leaf in two wavelength regions using two LED (light emitting diode) elements and one silicone photodiode.

The prior art therefore forces the user or farmer to take a big number of measurements in order to spot differences within the agricultural field in a time-intensive manner. On the other hand, if the user or farmer does not have the time to carry out all those measurements needed to ensure that the measurements are representative of the true crop nutrient content, the discussed systems will only provide a local measurement which can be representative of a single plant, but not of the whole field. In worst case scenario, if only a few measurements could be provided, and the location where the measurements were taken at has a crop nitrogen content far away from the average crop nutrient content of the rest of the crop, a wrong nutrient recommendation will be produced for the whole crop, therefore causing losses and possible contamination.

SUMMARY

The current disclosure aims at providing solutions for the problems which the use of such a device entail. While direct readings offer the advantage of precision, it is cumbersome to determine the variability across a whole crop, since it would involve a great amount of measuring points. Further, depending on the location chosen for carrying out the measurements, these can be not representative of the general crop nutrition status. Due to the in-field variability present in the multiplicity of factors which determine the nutrition status of a crop, it would be advantageous to either prevent these non-representative readings by indicating the user/farmer where the measurements are to be conducted, or alternatively, compensate the measurements taken at a random location to achieve a variable nutrient recommendation which take into account these in-field variations.

According to a first aspect of the present disclosure, this and other objectives are achieved by a method for providing a fertilizer recommendation for a crop with a handheld system comprising a crop nutrient detection device, wherein the method comprises the steps of determining a crop nutrient content by carrying out at least a measurement $M_j$ by means of the crop nutrient detection device in at least one location $(x_j,y_j)$ within the agricultural field; determining the crop nutrient detection device position at the at least one measurement location; receiving data, wherein receiving data comprises receiving field data of the agricultural field and receiving remote spectral data from at least a plurality of wavelengths of the agricultural field; processing the data to obtain at least one coefficient indicative of the crop status within the agricultural field; generating a fertilizer recommendation for the crop within the agricultural field based on the determined crop nutrient content, the determined position of the crop nutrient detection device and the at least one coefficient indicative of the crop status within the agricultural field.

Following this approach, in-field variabilities in crop nutrition status of a crop can be accounted for.

According to a further embodiment, the method further comprises generating the fertilizer recommendation using the determined crop nutrient content in the at least one location as baseline value for the agricultural field, and adjusting the fertilizer recommendation at a given location of the agricultural field based on the value of the at least one coefficient in the given location.

Following this approach, the precise value of the direct measurement of the crop nitrogen device calibrates the remote data.

According to a further embodiment, the method further comprises receiving farm and/or weather data, and generating a fertilizer recommendation for the crop within the agricultural field further comprises adjusting the fertilizer recommendation based on at least one of the received field, farm and/or weather data.

Following this approach, different application approaches can be achieved depending on further properties of the agricultural field.

According to a further embodiment, the method further comprises determining the fertilizer recommendation for a given location $N_{REC}$ $(x_i,y_i)$ based on a plurality of measurements M at locations $(x_j, y_j)$ is defined by the following equation: $N_{REC}(x_i, y_i)=f(M(x_j,y_j))+C*g[R(x_i,y_i)-R_0]$, wherein f represents an agronomic calibration function that translates the at least one measurement value of the crop nutrient detection device into a baseline value fertilizer recommendation; g represents an agronomic calibration function that translates the value R of the at least one generated coefficient at $(x_i,y_i)$ into a respective location dependent fertilizer recommendation, R represents the value of the at least one coefficient or a combination thereof considered at position $(x_i,y_i)$, and C and $R_0$ represent calibration constants.

Following this approach, the fertilizer recommendation can be calibrated.

According to a further embodiment, the method further comprises using the fertilizer recommendation is used for controlling one or more agricultural machines to perform one or more fertilizing operations within the agricultural field.

Following this approach, the fertilizer recommendation can be implemented in the agricultural fields.

According to a second aspect of the present disclosure, this and other objectives are achieved by a computer implemented method for determining at least one measurement region for carrying out at least one measurement with a crop nutrient detection device for providing a fertilizer recommendation to a crop, comprising the steps of determining an agricultural field comprising the crop for which the recommendation is intended and receiving data, wherein receiving data comprises receiving field data of the agricultural field and determining at least one measurement region within the agricultural field for carrying out the at least one measurement based on the field data.

Following this approach, a measurement region where to conduct the measurements is adapted to the field conditions.

According to a further embodiment, the method further comprises receiving remote spectral data from at least a plurality of wavelengths of the agricultural field, and the method further comprises the steps of processing the remote data to obtain at least a coefficient indicative of the crop status within the agricultural field and further determining the at least one measurement region within the agricultural field for carrying out the at least one measurement based on the at least one coefficient.

Following this approach, a measurement region representative of a health status condition can be determined.

According to a further embodiment, the method further comprises determining at least one measurement location within the measurement region.

Following this approach, sampling locations within the measurement region can be determined to improve the reliability of the measurements, avoiding plant-based variations.

According to a further embodiment, the method further comprises determining a region wherein a value R of the at least one coefficient or a combination thereof is comprised within a range of at least one of the following: $0.7 R_{Avg}<R<0.85 R_{Avg}$, or $0.85 R_{Avg}<R<1.15 R_{Avg}$, or $1.15 R_{Avg}<R<1.3 R_{Avg}$, wherein $R_{Avg}$, is defined as the average value within the agricultural field of the at least one coefficient.

Following this approach, a specific fertilizer recommendation depending on area-specific calibrations can be achieved.

According to a further embodiment, the method further comprises receiving geographic identifiers regarding the geometry of the boundaries of the agricultural field, and wherein determining the at least one measurement region within the agricultural field further comprises determining the at least one measurement region based on the field data.

Following this approach, the measurement regions can be accurately determined away from the boundaries.

According to a further embodiment, the crop nutrient detection device comprises a location unit and the method further comprises receiving location data from the crop nutrient detection device and determining the at least one measurement region based on the location data.

Following this approach, a measurement region closer to the vicinity of the farmers can be determined.

According to a further embodiment, the method further comprises receiving crop data and weather data, wherein determining the at least one measurement region within the agricultural field further comprises determining the at least one measurement region based on the crop and weather data.

Following this approach, a fertilization application limit date can be determined, and the farmer can react timely.

According to a further embodiment, the method further comprises receiving weather forecast data and wherein determining the at least one measurement region within the agricultural field further comprises determining the at least one measurement region based on the weather forecast data.

Following this approach, the farmer can avoid scheduling fertilization applications through practices which are not indicated in view of the weather forecast.

According to a further embodiment, the method further comprises determining a sub-area within the agricultural field, where the at least one measurement region should be contained.

Following this approach, the farmers can direct the search of the at least one measurement region to a predetermined area to their convenience.

According to a further embodiment, the method further comprises receiving farm data and determining the measurement region based on the farm data.

Following this approach, farm data can be regarded for the placing of the at least one measurement region.

According to a further embodiment, the method further comprises receiving remote spectral data including receiving temporal series of the spectral data.

Following this approach, further parameters indicative of the crop status can be taken into consideration in order to improve the fertilizer recommendation or the measurement region determination.

According to a further embodiment, the method further comprises determining a crop nutrient content in at least one of the measurement regions and generating a fertilizer recommendation.

Following this approach, an improved fertilizer recommendation can be achieve upon subsequent determination of the crop nutrient content in the measurement regions.

According to a further aspect of the present disclosure, this and other objectives are achieved by a computer implemented method for determining at least one measurement region for carrying out at least one measurement with a crop nutrient detection device for providing a fertilizer recommendation to a crop, comprising the steps of determining an agricultural field comprising the crop for which the recommendation is intended, receiving data, wherein receiving data comprises receiving field data and remote spectral data from at least a plurality of wavelengths of the agricultural field, the method further comprising the steps of processing the remote data to obtain at least a coefficient indicative of the crop status within the agricultural field and further determining the at least one measurement region within the agricultural field for carrying out the at least one measurement based on the at least one coefficient.

According to further aspects, a system, a data processing apparatus, a computer-readable storage medium, and a computer program product configured to carry out the above discussed methods are envisaged within the present disclosure.

According to a further embodiment, the system further comprises a display and an input unit, wherein the system further comprises a graphical user interface configured to display the at least one measurement region.

According to a further embodiment, the graphical user interface is further configured to display a plurality of measurement regions and is further configured to receive an input for selecting at least one from the at least one of the plurality of measurement regions displayed;

Following this approach, the farmers can freely select from the available measurement regions which are suitable for carrying out the measurements.

According to a further embodiment, the system is further configured to display weather forecast data associated with the at least one measurement region.

Following this approach, the farmers can consider weather conditions when selecting the at least one measurement regions.

According to a further embodiment, the system is further configured to receive farm data and display at least one scheduled task, wherein the system is further configured to display the at least one measurement region, and different itineraries which include the at least one measurement region and at least one of the scheduled tasks displayed.

Following this approach, the farmers can plan accordingly their itineraries in the agricultural field.

According to a further embodiment, the system is further configured to receive an input for determining at least one predetermined area of the agricultural field and the system is further configured to determine the at least one measuring region within the at least one predetermined area.

Following this approach, the farmers can direct the search of the at least one measurement region to a predetermined area to their convenience.

BRIEF DESCRIPTION OF THE FIGURES

The accompanying drawings, which are included to provide a further understanding of the present disclosure and are incorporated in and constitute a part of this specification, illustrate embodiments of the disclosure and together with the description serve to explain the principles of the disclosure.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

DETAILED DESCRIPTION

As used below in this text, the singular forms “a”, “an”, “the” include both the singular and the plural, unless the context clearly indicates otherwise. The terms “comprise”, “comprises” as used below are synonymous with “including”, “include” or “contain”, “contains” and are inclusive or open and do not exclude additional unmentioned parts, elements or method steps. Where this description refers to a product or process which “comprises” specific features, parts or steps, this refers to the possibility that other features, parts or steps may also be present, but may also refer to embodiments which only contain the listed features, parts or steps.

The enumeration of numeric values by means of ranges of figures comprises all values and fractions in these ranges, as well as the cited end points. The term “approximately” as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the disclosure disclosed herein. It should be understood that the value to which the term “approximately” refers per se has also been disclosed.

Unless defined otherwise, all terms present in the current disclosure, including technical and scientific terms, have the meaning which a person skilled in the art usually gives them. For further guidance, definitions are included to further explain terms which are used in the description of the disclosure.

Figure 1:
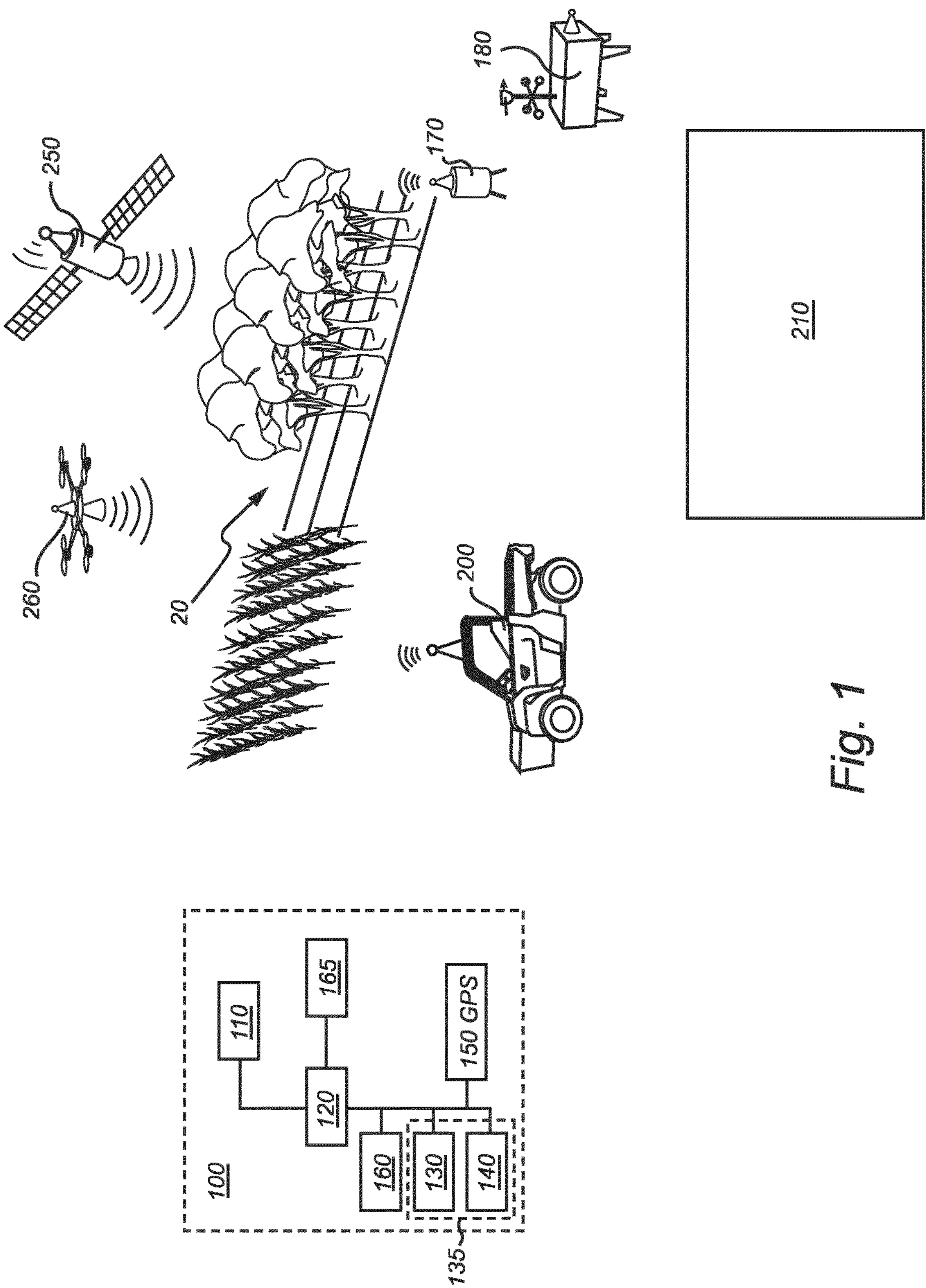
FIG. 1 shows a system according to an embodiment of the present disclosure.

In FIG. 1, an example of a system according to the present disclosure is represented. FIG. 1 depicts an agricultural field comprising a crop within an agricultural region with other systems and apparatus with which the system 100 may interoperate. A system 100 according to the present disclosure comprises a crop nutrient detection device 110 and a communication unit 120.

Crop nutrient detection devices as the ones discussed in the prior art above, present different constructional arrangements. Some embodiments of these devices comprise an own communication unit or are operably connected to a mobile communication device like a smartphone or tablet which functions as communication unit, as pointed in the prior art. In other embodiments, the devices are peripherals attached to the mobile communication device, using a camera of the mobile communication device as optical detection unit, basing respectively the determination of the crop nutrient content on the reflectivity or transmissivity of the leaves at specific wavelengths. However, no specific determination of the detection principle is intended for the goal of the current disclosure, since the specificities of the detecting principle is not intrinsically related to the advantages provided by the current disclosure.

Communication unit 120 may therefore be a dedicated unit integrated with the crop nutrient detection device 110 or a separate electronic device operably connected to the crop nutrient detection device 110. In some embodiments, the crop nutrient detection device 110 may be a peripheral device operably connected or integrated with a mobile phone. In a further embodiment system 100 may be a handheld mobile device. Different examples of these embodiments would be represented by already existing devices of the applicant like the N-Tester BT®, the N-Tester Clip® and Yaralrix®, which are incorporated here by reference.

While the N-Tester BT® and the N-Tester Clip® are based on the change of light intensities in certain wavelengths upon light transmission through a plant leaf, Yaralrix® is based on ground-based photographs of plant canopies taking into account sun's light reflectivity. As mentioned above, all embodiments are considered for the current disclosure since the detection method principles does not compromise the approach of the current disclosure.

System 100 comprises several components such as a processor 160, a wireless communication unit 120, a location determining unit 150, a memory unit 165, a display 130 and an input unit 140, which might be combined as a touch sensitive screen 135.

System 100 may further comprise an agricultural recommendation engine 210 to which the system is remotely connected by means of the communication unit. Agricultural recommendation engine 210 may be represented by a computer, a remotely accessible server, other client-server architectures or any other electronic devices usually encompassed under the term data processing apparatus. Agricultural recommendation engine 210 may comprise field and farm data and external data, whereby external data comprises weather data and further data provided by weather forecast providers or other third parties. Field data may comprise amongst others, field and geographic identifiers regarding the geometry of the boundaries of the agricultural field, including the presence of areas within the agricultural field which are not managed, topographic data, crop identifiers (crop variety and type, growth status, planting data and date, plant nutrition and health status), harvest data (yield, value, product quality, estimated or recorded historic values), soil data (type, pH, soil organic matter (SOM) and/or cation exchange capacity, CEC) as well as historic series of the data. Farm data may comprise further data regarding to planned and past tasks like field maintenance practices and agricultural practices, fertilizer application data, pesticide application data, irrigation data and other field reports as well as historic series of the data, allowing the comparison of the data with past data, and further administrative data like work shifts, logs and other organizational data. Planned and past tasks may comprise activities like surveillance of plants and pests, application of pesticides, fungicides or crop nutrition products, measurements of at least one farm or field parameter, maintenance and repair of ground hardware and other similar activities.

The agricultural recommendation engine 210 may be configured to retrieve soil data from available online soil databases like SoilGrids from the World Soil Information, SSURGO (Soil Survey Geographic Database from the United States Department of Agriculture) or any similar soil data repository.

System 100 may be further configured to receive any of the above-mentioned data and further field data from a predetermined number of locations within or nearby the analyzed region, inputted manually by the users/farmers by means of the input unit 140 or received by the communication unit 120 from dedicated sensors 170. Further, system 100 and agricultural recommendation engine 210 may be configured to receive weather data from nearby weather stations 180 and/or external crop/farm sensors 170, as well as by means of the input unit 140. Nearby weather stations 160 and/or external crop/farm sensors 170 are configured to communicate via one or more networks. In another embodiment, weather data is provided by external weather forecast companies. Weather data may further include present and past temperatures, accumulated precipitation, relative humidity, wind speed, solar radiance, accumulated sun hours, etc.

System 100 may further be operatively connected to an agricultural apparatus 200. Examples of agricultural apparatus 200 include tractors, combines, harvesters, planters, trucks, fertilizer equipment, and any other item of physical machinery or hardware, typically mobile machinery, and which may be used in tasks associated with agriculture. In one embodiment, system 100 may be configured to communicate with the agricultural apparatus 200 by means of wireless networks in order to set a variable rate application prescription for the determined crop, or alternatively, to determine the measurement region as indicated destination. System 100 may be further configured to produce a downloadable script file for the agricultural apparatus to carry out the fertilizer application.

Figure 2A:
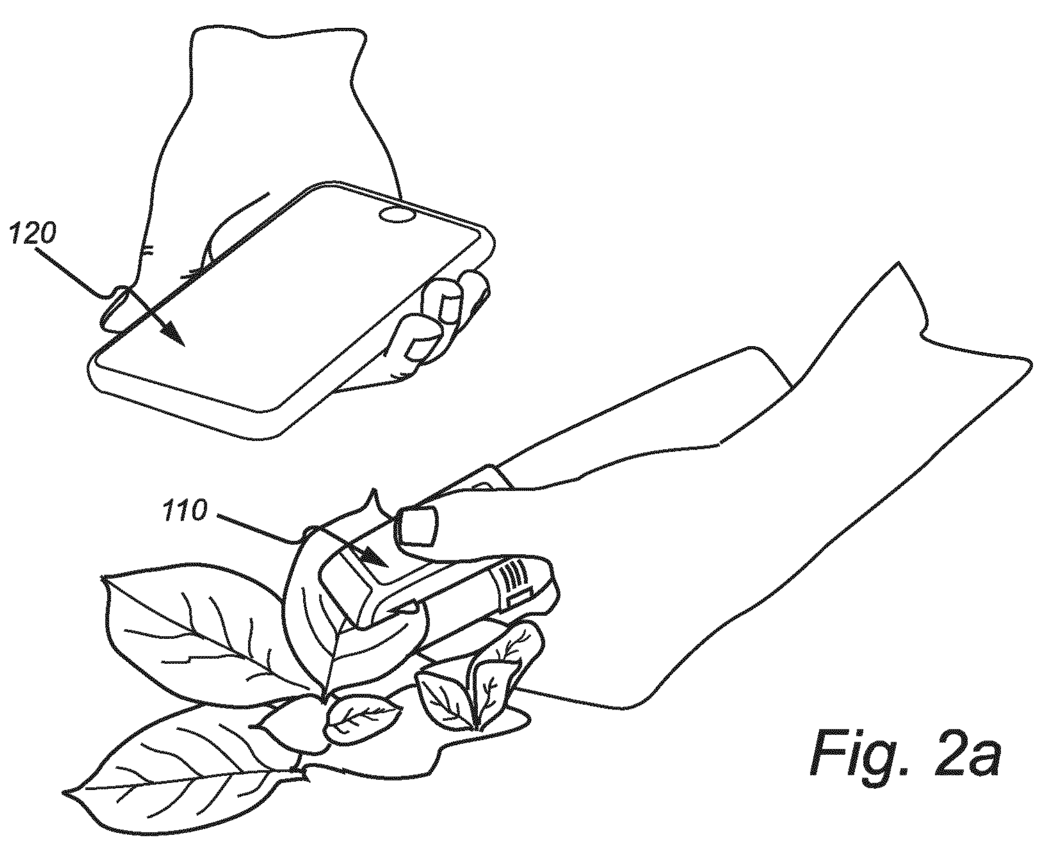
FIGS. 2*a* and 2*b* show an exemplary use of the different systems of the current embodiment.
Figure 2B:
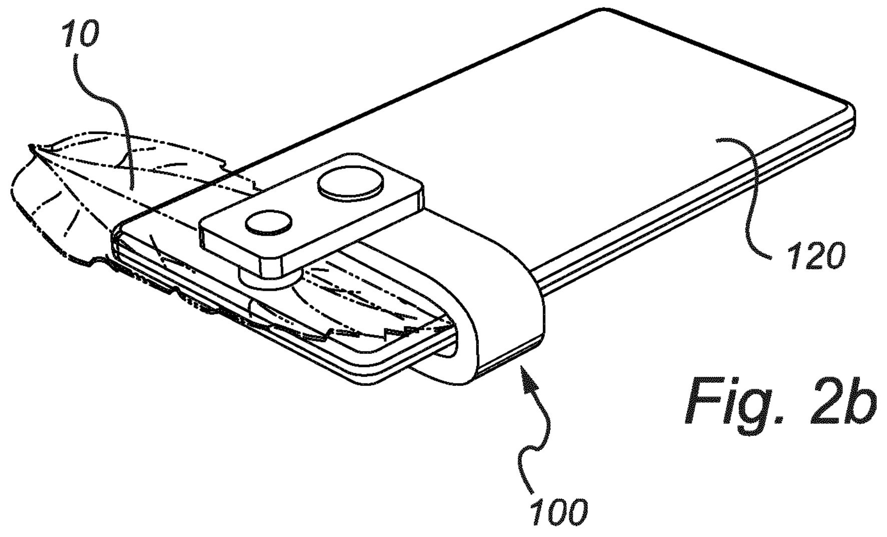

FIGS. **2*a*-*b* show examples of the use of a system according to embodiments of the current disclosure. FIG. 2*a* shows an embodiment of the current disclosure where the communication unit 120 and the crop nutrient detection device 110 are different elements. Crop nutrient detection device 110 is operatively connected to the communication unit by means of a suitable wireless connection. FIG. 2*b* shows a further embodiment of the current disclosure where the system is formed by a mobile phone and a peripheral element operatively connected to the mobile phone enables the mobile phone to determine the crop nutrient level based on the transmissivity of light through the plant leave 10 situated in between. The farmer, when in a field, is able of determining the plant nutrient content by directly analyzing one or more leaves 10** of a plant present in the agricultural field. The farmers, when directly measuring the plant nutrient content by means of the crop nutrient detection device, can rely on their knowledge to determine plants which show a healthy status (no discolored leaves or abnormally looking plant). The farmers might take a plurality of measurements within an area, hoping to collect enough measurements which can be representative of the crop nutrient content within the agricultural field. However, in spite of the best intentions and knowledge of the farmers, they cannot be aware of the variability across the agricultural field due to in-field variabilities across the field of several parameters (soil properties and sub-soil water conditions among others), and can therefore unwillingly collect a crop nutrient content based on these measurements which are not representative of the average crop nutrient content for the whole crop. While it is feasible to take enough measurements to cover the whole agricultural field, it would require an enormous amount of work from the farmers. As such, while non-destructive direct measurements can be very accurate in a very local and restricted way, there is a need to improve the accuracy of fertilizer recommendations for the crop across the whole agricultural field reducing the amount of work the farmers are required to put in.

The current disclosure aims at solving this problem by means of alternate solutions. On one hand, when the farmer is on-site, the current disclosure aims at enhancing fertilizer recommendations for the measurements which might be carried out by the farmer at need at a given location. Alternatively, the farmer may be pointed and directed to at least one measurement region for carrying out the measurements wherein the average crop nutrient content is representative for the type of fertilization procedure intended. For example, the farmers, at the start of their days, when planning the tasks and activities to be carried out on the agricultural field may determine a measurement region where it would be of advantage to carry out the measurements. Hence, the current disclosure, aiming at providing different solutions to the farmer for improving current methods, offers further advantages with regard to the prior art.

Figure 3:
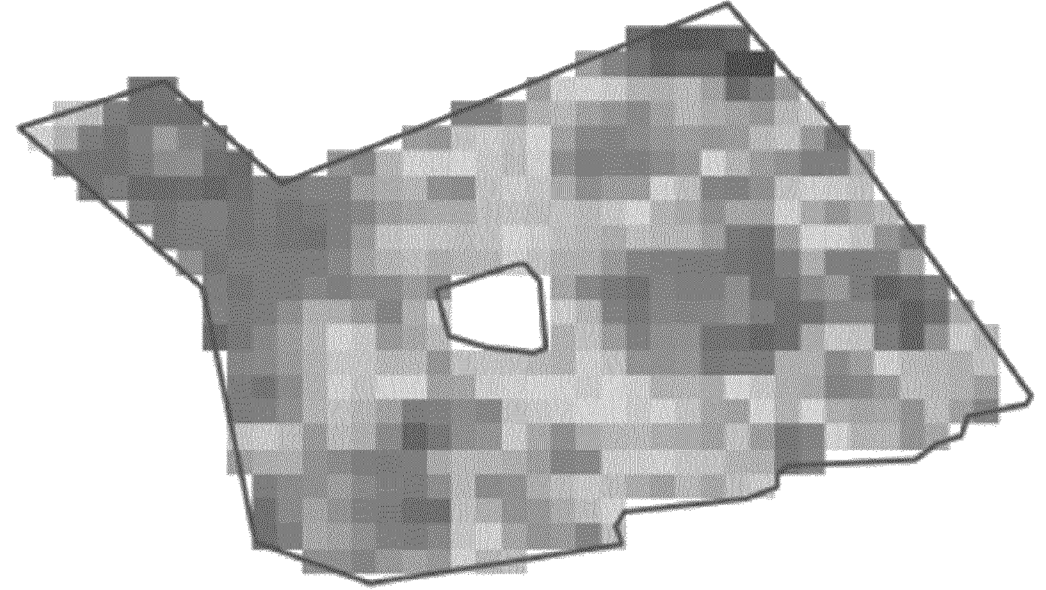
FIG. 3 shows a representation of the value of the at least one coefficient computed from remote data in an agricultural field.

FIG. 3 shows an embodiment of remote data representing the values of one of the plurality of coefficients generated from the remote data including at least a plurality of wavelengths, showing the distribution over the agronomic field and the in-field variabilities.

The present application makes use of suitable remote data for determining the in-field variability of the crop nutrient content. Remote data can be referred to data provided by imaging satellites 250 or suitable manned or unmanned imaging aerial vehicles 260. These satellite or vehicle systems are configured to communicate by means of dedicated networks and usual methods which do not need being disclosed herein. Amongst the different remote data available for use, satellite data is nowadays widely available from numerous public (LANDSAT from NASA, SENTINEL from ESA) and/or private providers. The present method is however not limited to a satellite data platform, since the spectral bands which can be of use for the present method are provided in a big range of the standard satellite data and can as well be provided by means of drones or other unmanned aerial or terrestrial vehicles with image sensors in the required spectral bands or a combination thereof. Due to the differences present across different satellite and optical sensor platforms, it is hereby not intended to limit the support of the current disclosure to exact and specific wavelengths and the given wavelengths are provided for orientation. While different factors and corrections can be introduced to account for these variabilities, the use of wavelengths proximate to the ones mentioned below should be understood since the specifications of said platforms vary accordingly.

In an embodiment, remote data is obtained from the Sentinel-2 satellite. The Sentinel-2 mission contains a MSI (Multi Spectral Instrument) that takes high spatial resolution data in order to monitor Earth's surface. The MSI works passively, by collecting sunlight reflected from the Earth and is therefore a more efficient and less energy consuming detection method. Sentinel-2 consists of 13 bands with different spatial resolutions (10 m, 20 m or 60 m), in the visible, near infrared, and short-wave infrared part of the spectrum. In an embodiment, the current method uses the image data related to spectral bands with at least a plurality of wavelengths comprised approximately between 700 and 850 nm. In a further embodiment, the present method uses data related to spectral bands with a wavelength of approximately 740 and 780 nm. The use of Sentinel-2 spectral bands from the MSI produces measurements with a high resolution (approx. 20 m) and is therefore preferred for the implementation of the current disclosure. However, Sentinel-2 data is not available on cloudy days. In this sense, although less precise, the current disclosure may comprise the use of remote data from Sentinel-1 or other active SAR satellites which can be used in cloudy days. However, the current disclosure offers the further advantage that in order to achieve an accurate nitrogen recommendation, there is no need for having a very recent image. In-field variability usually remains constant or has slower dynamics, provided the absence of locally limited pests or other events.

In an embodiment, remote data comprises data relating to different spectral bands are used for improving the determination of the present method. For example, the normalized-difference snow index (NDSI) comprises the use of spectral bands around the values of 530-610 nm (visible green) and 1550-1750 nm (short-wave infrared, SWIR) in order to determine areas covered by snow. Snow cover is as bright as the clouds, and this makes it difficult to differentiate it from the cloud cover. However, at around 1600 nm, snow cover absorbs sunlight and it appears therefore darker than the clouds. This enables an effective distinction between clouds and snow cover. Further compensation and calibration algorithms are considered in the present application, depending on the nature and origin of the remote data. In one embodiment, remote data is preprocessed for cloud and haze removal and light calibration, which is of advantage may the remote data be provided by means of a satellite as described above. In another embodiment, when the remote data is provided by a manned or unmanned aerial vehicle or drone, cloud correction is not needed, but different light compensation procedures are envisaged to compensate for the sunlight characteristics and sun relative position.

Once the remote data has been received, wherein the remote data comprises imagery data from at least a determined location comprising a plurality of spectral bands or optical domains of different wavelengths, the system is configured to generate at least one coefficient derived from the remote data. Different coefficients (or indexes) have been used in the literature for obtaining different agricultural, soil and vegetation information like the difference vegetation index and the normalized difference vegetation index (NDVI). However, NDVI is sensitive to the effects of soil brightness, soil color, atmosphere, clouds, cloud shadows, and leaf canopy shadows and requires remote sensing calibration. In that sense, further coefficients contemplated may comprise the Atmospherically Resistant Vegetation Index (ARVI) to reduce the dependence of atmospheric effects; the Soil-Adjusted Vegetation Index (SAVI) or the Type Soil Atmospheric Impedance Vegetation Index (TSARVI) which take into consideration the distinction of vegetation from the different types of soil background. Apart from the standard vegetation indexes comprised in the state of the art, the present application may make use of two further indexes which will be described in more detail below.

In order to provide a reliable vegetation index or coefficient which is indicative of the chlorophyll content present in the vegetation, the further indexes of the application may include different wavelengths at the so-called red edge of vegetation between 670 and 840 nm.

In a further embodiment, in order to provide a reliable vegetation index or coefficient which is indicative of the water content present in the vegetation, the remote data may comprise a further remote data comprising further wavelengths at or close to water absorption bands, such as around 950 nm, 1100, 1450 or 1950 nm in order to determine the canopy water content.

Hence, formulations of a vegetation index according to the present considerations can be expressed as any suitable combination or a mathematical relation of different signals of different wavelengths, like for example the NDVI, which can be expressed as:

$$NDVI = \frac{NIR - \text{RED}}{NIR + \text{RED}},$$

wherein NIR and RED represent the data relating to the respective wavelengths of near infrared and red bands, or values closest to them in the respective satellite platform as explained above. The present index is therefore sensitive to the chlorophyll content present in the vegetation and a direct relationship with the total amount of nitrogen within the canopy can be directly derived.

Further, instead of, or in addition to, determining chlorophyll, dry fresh biomass can be determined. The biomass determination can be independent of chlorophyll. Fresh biomass can, e.g., be calculated from corresponding vegetation index like the Leaf Area Index (LAI), which can be defined as follows:

$$LAI = \frac{NIR}{\text{RED}+SWIR},$$

wherein NIR and RED represent as above the data relating to the respective wavelengths of near infrared and red bands and SWIR represents the short-wave infrared. Determining the chlorophyll content, directly related to the crop nitrogen content, and the dry fresh biomass, a more accurate nutrient recommendation including other elements like potassium or phosphorus can be carried out.

The above listed coefficients are merely some of the suitable ones to carry out the method of the current disclosure. However, the list of coefficients (or indexes) is not meant to be limiting. There is a great variance of different coefficients which are as well able of being used by the present method, as mentioned above for computing other properties of agronomical fields (e.g., soil moisture) which although not directly indicative of crop nutrient content, assist the determination of a fertilizer recommendation by improving further insights into other field parameters.

In a further embodiment, remote data may further comprise temporal series of the remote spectral data for determining the corresponding coefficient or vegetation indexes which enable determining other parameters which might influence or reflect the crop status and the fertilizer recommendation. For example, receiving temporal series of the current and/or previous crop seasons of the remote spectral data may be used to identify, e.g., crop type and yield from previous crop seasons or a yield forecast for the present crop season, wherein the agricultural field may have been used for different crop types in the past. Further, high yield areas of previous seasons within the agricultural field can be determined in order to improve the fertilizer recommendations and/or to guide the farmers to these areas to assess specific fertilizer needs.

Once the at least one coefficient indicative of the crop status within the agricultural field has been generated the determination of different factors like chlorophyll, nitrogen uptake and biomass amongst others may be accounted for generating a location dependent nutrient recommendation which takes into consideration the infield variability of the crop status within agricultural field, as will be explained below.

When the farmers collect at least a measurement $M_j$ at a determined location $(x_j,y_j)$ within the agricultural field, the present system is configured to determine a baseline value for the fertilizer recommendation in such a way that an accurate recommendation, based on direct crop nutrient measurement is achieved. In order to take into account the infield variability present in the crop, a further term, based on the coefficient generated from the remote data is added. As such, the fertilizer recommendation for a given location $N_{REC}$ $(x_i,y_i)$ based on a plurality of measurements M at locations $(x_j, y_j)$ may be defined by the following equation:

$$N_{REC}(x_i, y_i) = f(M(x_j, y_j)) + C * g[R(x_i, y_i) - R_0],$$

wherein ƒ represents an agronomic calibration function that translates the at least one measurement value of the crop nutrient detection device into a baseline value fertilizer recommendation, g represents an agronomic calibration function that translates the value of the at least one generated location dependent coefficient into respective location dependent fertilizer recommendation, R represents the value of the at least one coefficient or a combination thereof considered at position $(x_i,y_i)$, and C and $R_0$ represent calibration constants. Agronomic calibration functions ƒ and g may further receive farm and field data regarding additional agronomic parameters like growth stage, crop type, variety, etc. to improve the recommendations, as well as historic data. While $N_{REC}$ and therefore the values provided by ƒ and C*g are scalar values in the case in which a single nutrient is recommended, the current formula may be expressed in a vector-matrix form wherein each nutrient element can be accounted for row-wise. In this embodiment, calibration constant C may comprise a vector with as many elements as nutrients considered. In a further embodiment, calibration constant C may comprise a matrix which takes into consideration cross-coupling effects of the at least one generated coefficient, wherein $C_{ij}$ represents the matrix element in row i and column j, which represents a further calibration parameter depending on the respective coefficient and their relationship with the respective nutrient.

Agronomic calibration function ƒ may further comprise processing the measurements carried out by the crop nutrient detection device. Although the current method is intended to support the farmers when only a single measurement is carried out, the method of the current disclosure may comprise in this approach to determine a plurality of measurement locations distributed inside a measurement region which is determined by the current position of the farmers. Hence, ƒ may further comprise carrying out averaging techniques for the plurality of measurement locations within a measurement region.

References in the current application regarding the step of carrying out at least one measurement with a crop nutrient detection device are not intended to limit the scope of the present application. While it has been made reference throughout the description to the farmers carrying out the measurements, any action leading towards a determination of a crop nutrient status at a specific location as intended by the method of the current disclosure is considered as a possible embodiment within the teachings of the current application and it must not include the action of a farmer or further actor. For example, determining a crop nutrient content by carrying out at least a measurement may only comprise receiving measurement data by means of a communication unit or any suitable network which represent the crop nutrient status of the measured crop at the predetermined position by means of a crop nutrient device according to the different embodiments present in the current application.

Alternatively, the farmers will be provided with a measurement region where to carry out the measurements. The farmers, when on-site, and depending on the type of crops, might only have a visual reach of a couple rows of crop and does not have an overall view of the general nutrition status of the crop. When deciding to sample for convenience around the area the farmers are at, they might choose an unsuitable spot for carrying out the measurements. Usually, when reaching the agricultural field, farmers choose a region which is easily accessible, close to the borders of the agricultural region. However, boundary regions in agricultural fields are not representative of the whole crop nitrogen status. Local regulations and other constraints from fertilizing machinery and agricultural works render fertilization uneven. Fertilizing outside of field boundaries may be forbidden due to environmental constraints. Due to the more frequent passage of heavy vehicles on the boundaries of the fields, soil is compacted and degraded, from which the crop closest to the boundary suffer. Further, remote data comprising imagery from the agricultural field 20 gets less representative towards the boundaries due to the above-mentioned effects and further data processing steps, which due to the discontinuities generated by the shape of the farm can cause further noise arising from the remote data. Moreover, farm field geometry variations within the boundaries have further impacts regarding both remote data and crop nutrition status and therefore should be taken into account. As such, the current disclosure, while aiming at providing a suitably accessible location to the farmers, due to the consideration of the agricultural field boundary and/or remote data, can provide measurement regions conveniently close to the boundary for the farmers which are representative of the average and general crop nutrient status, improving the accuracy of a fertilizer recommendation for the crop over the whole agricultural field or a sub-area of it. However, the current method is not limited to finding measurement regions near the border, since due to other operational constraints, areas well within the agricultural field may be of interest, as it will be made clear below.

FIGS. 4*a-d* refer to the embodiments of the current disclosure in which the farmers are alternatively provided with at least a measurement region 300 for carrying out the measurements as explained.

System 100 is configured to determine an agronomical field containing the crop for which the measurements are intended. In a further embodiment, a sub-area of the agronomical field may be defined to contain the measurement regions if only area-specific treatments are intended. Determining an agronomical field may comprise receiving inputs from the farmers via the input unit to manually select a specific field of interest for the farmers. Determining an agronomical field may comprise determining the agronomical field based on field data, crop data and/or weather data. As it will become apparent, the current system may determine a fertilizer application limit date for a plurality of fields, wherein the system is configured to determine an agronomical field based on the fertilizer application limit date. Determining an agronomical field may further comprise automatically detecting, based on the crop nutrient detection device location and the field data, the agronomical field where the farmers are.

In an embodiment, determining the at least one measurement region in the agronomical field for carrying out at least a measurement is based on the field data. Field data may comprise amongst others, field and geographic identifiers regarding the geometry of the boundaries of the agricultural field, including the presence of areas within the agricultural field which are not managed, topographic data, crop identifiers and the like. As such, the current method offers a straightforward determination based on the geometry on the field and can therefore avoid boundary regions.

In an embodiment, the measurement region is determined based on the remote data representative of the crop status as explained above. Once the remote data has been processed to obtain at least one coefficient (R) indicative of the crop or soil status, the current method determines the measurement regions based on the coefficient. Further, the current method may further determine measurement regions where R is comprised between a predetermined range. Depending on the type of fertilizer application intended, R maybe defined to be within a range of $0.7\ R_{Avg}<R<0.85\ R_{Avg}$, or $0.85\ R_{Avg}<R<1.15\ R_{Avg}$, or $1.15\ R_{Avg}<R<1.3\ R_{Avg}$, wherein $R_{Avg}$ is defined as the average value within the agricultural field of the at least one coefficient or combination thereof. Ranges may as well be defined otherwise. In fields with crops with little variability, these ranges made be defined to be comprised preferably within a range of $0.9\ R_{Avg}<R<0.975\ R_{Avg}$, or $0.975\ R_{Avg}<R<1.025\ R_{Avg}$, or $1.025\ R_{Avg}<R<0.9\ R_{Avg}$. Moreover, ranges may be defined dynamically, wherein each individual range may be determined proportional to the standard deviation of R. The farmers, when aiming for a fertilizer recommendation, may want to create area-specific application of fertilization. For example, a levelling or a boosting approach can be envisaged, wherein only zones having a higher or a lower nutrient level are fertilized to either bring the lower areas up to a certain nutrient level, or avoiding to fertilize areas which due to external reasons are not able of taking up the nutrients. Hence, in order to determine said specific application of fertilizer, the current method may comprise determining the measurement regions such that the values of the at least one generated coefficient is comprised between the above-mentioned ranges. Further, system 100 may be configured to determine a sub-area within agricultural field 20 where the measurement region should be contained. In such a way, farmers can select areas of the crop where the fertilizer application should be carried out, from which the most suitable area for measurement will be correspondingly determined. This can be made based on farmers input or based on field and farm data, regarding specific issues of the field.

In a further embodiment, remote data used for the determination of measurement regions may further comprise temporal series of the remote spectral data for determining the corresponding coefficient or vegetation indexes which enable determining other parameters which might influence or reflect the crop status and the fertilizer recommendation. For example, receiving temporal series of the current and/or previous crop seasons of the remote spectral data may be used to identify, e.g., crop type and yield from previous crop seasons or a yield forecast for the present crop season, wherein the agricultural field may have been used for different crop types in the past. Further, high yield areas of previous seasons within the agricultural field can be determined in order to improve the fertilizer recommendations and/or to guide the farmers to these areas to assess specific fertilizer needs.

In an embodiment, determining the at least one measurement region may be based on their current location and position within or nearby the agricultural field. In such a way, a measurement region in the vicinity of the farmer can be chosen which is representative of the crop nutrition status.

In a further embodiment, once the at least one measurement region wherein the farmer is supposed to carry out the at least one measurement is determined, the system is further configured to provide a plurality of measurement locations 310 with a predetermined pattern within the measurement region. The number of measurement locations 310 and the resulting shape which these patterns represent within the measurement regions are configured to ensure the sampling quality of the measurements while keeping the effort for sampling as low as possible. In a further embodiment, a measurement path 320 which connects the measurement locations 310 is determined.

Due to the orientation, shape and further properties of the agricultural field, measurement regions 300 and/or locations 310 can be adjusted to improve the fertilizer recommendation based on the measurements from the crop nutrient detection device. As mentioned above, finding a suitable location for a farmer can take different factors into consideration.

As an example, the shape of the agricultural field may include several irregularities. While the usual representation of an agricultural field for farming purposes may be shown as of a regular rectangular shape, due to the presence of trees, roads and driveways, rivers and waterways, agricultural fields might take very different shapes. As a result, the average nutrition status around certain areas cannot be considered to be representative of the general nutrition status of the crop unless otherwise accounted for. In a further embodiment, determining a measurement region may be based on the distance from the region to designated areas within the field. For example, the presence of angles at the agricultural field boundary influences differently the average crop nutrition status of the field. When an obtuse angle is formed by the agricultural farm borders, when seen from the inside of the agricultural field (i.e. the angle defined by the region comprised between the two lines which contains the agricultural field), a constant fertilizer spreading rate may cause higher nutrient concentrations at the zone close to the origin of the formed angle than intended, whereas in the case of acute angles, due to the inferior amount of terrain covered when fertilizing around the origin, a lower nutrient concentration occurs. This effect may however be compensated or even reversed due to the constructional limitations of fertilization machinery and how the itinerary of the fertilizer application device is designed. Same considerations are to be taken analogously when considering inner borders within the agricultural field, as well as to the size of the regions not part of the agricultural field while being inside the outer boundaries of the agricultural field. Hence, determining at least a measuring region may be based on the shape of the field boundary. In a further embodiment, determining at least a measurement region based on the field boundary may further comprise determining a distance to predefined areas, and determining the at least one measurement region based on the distance. Predefined areas may comprise any area at the field boundary or within the boundary which define a change to the geometry of the agricultural field, like boundary angles, non-farmed islands within the field due to trees, rocks or other constraints and other boundary irregularities. This embodiment offers the further advantage that if remote data is not available due to network issues or availability problems, the method of the current application may still determine at least a measurement region avoiding field areas which are usually not representative of the average status. The advantages will become further apparent in combination with the below disclosed embodiments.

Figure 4A:
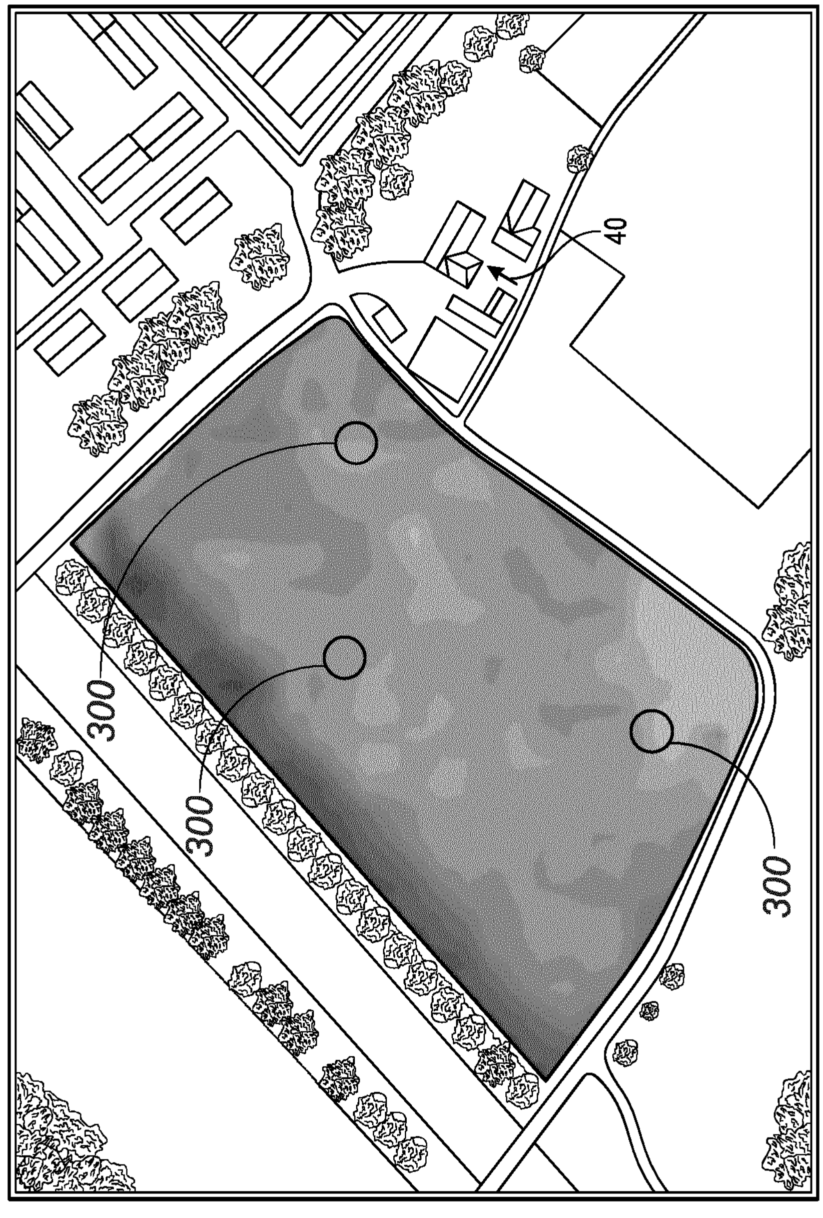
FIGS. 4*a-d* show a graphical user interface according to different embodiments of the current disclosure.
Figure 4B:
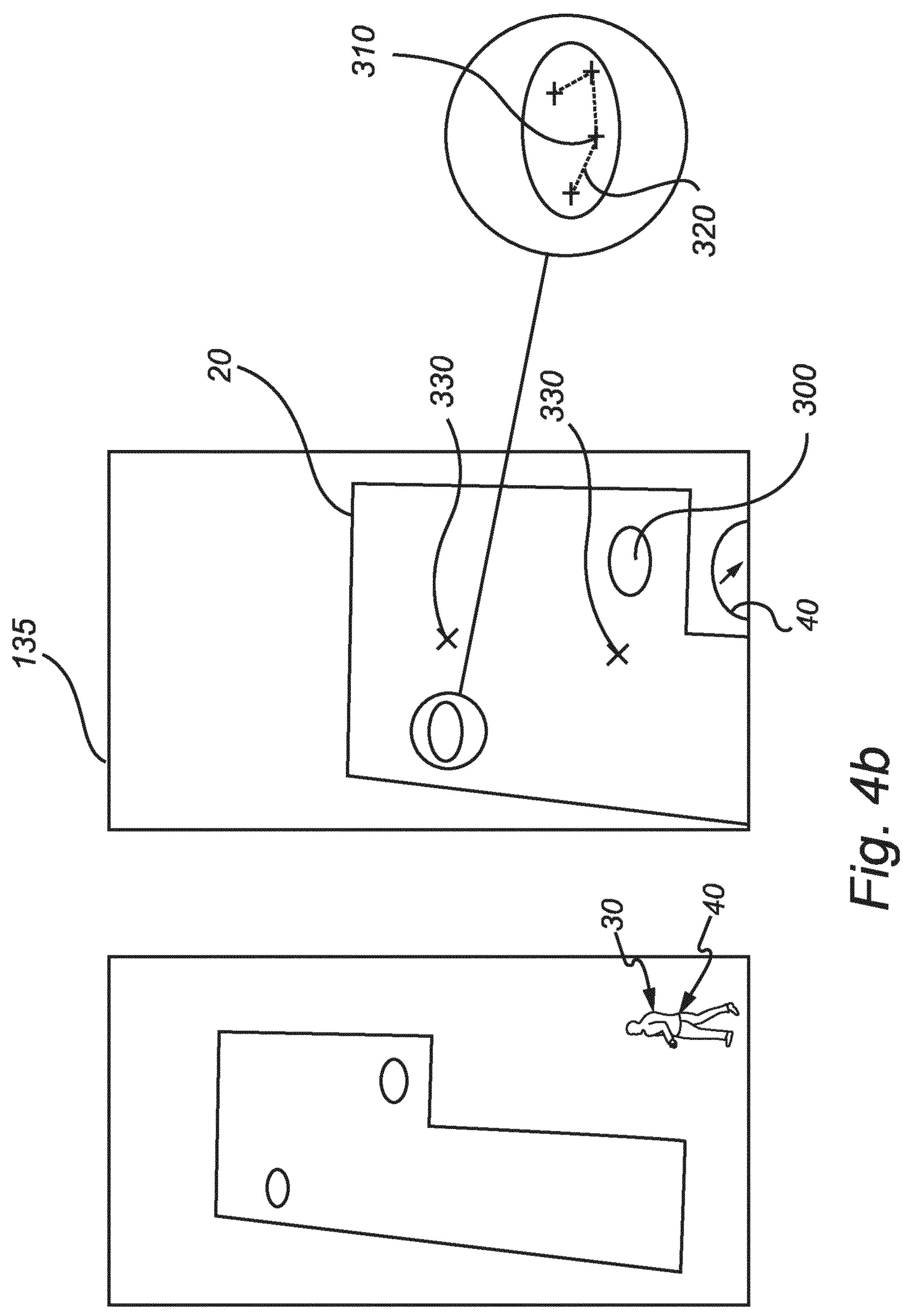
Figure 4C:
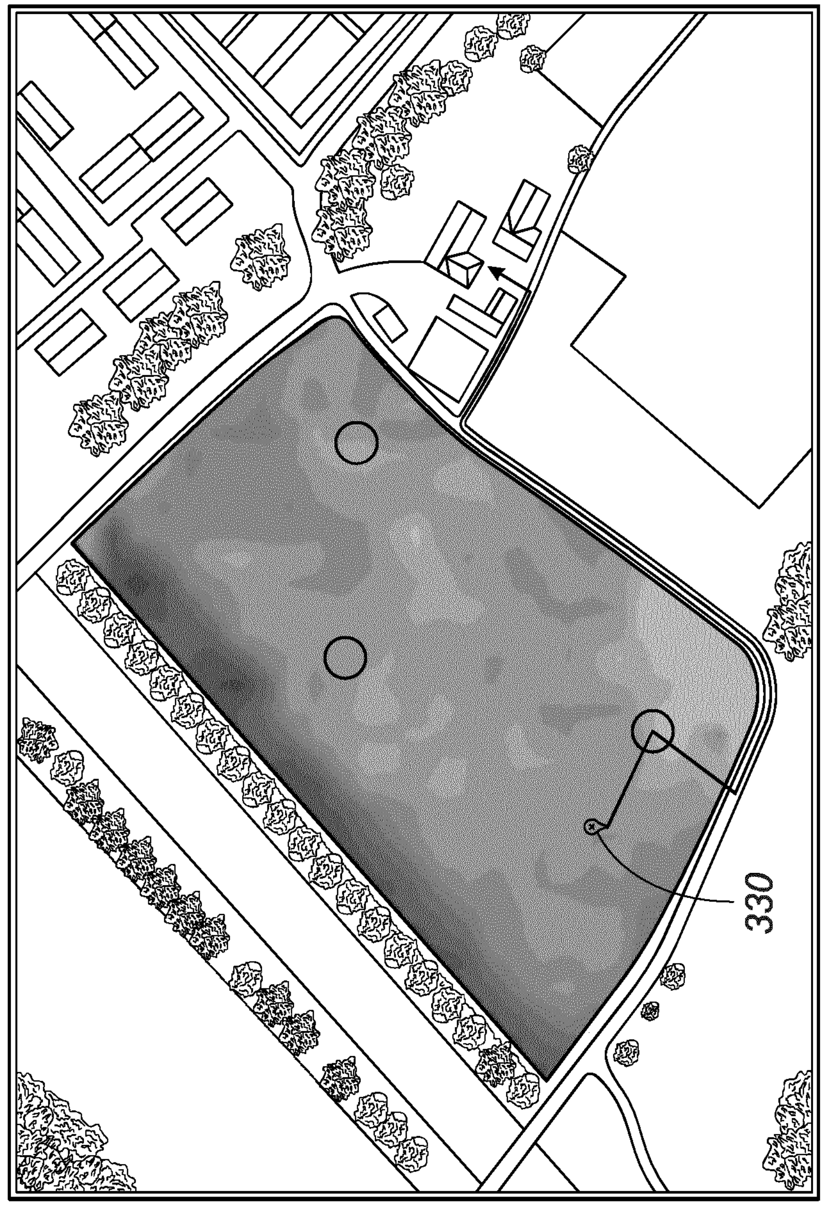

As shown in FIG. 4*b*, the method of the current disclosure may determine a plurality of measurement regions which the farmers can select according to their convenience. Moreover, determining the at least one measurement region may further comprise the inclusion of farm data for the determination. In such way, the measurement regions 300 and locations 310 can be determined taking into consideration different tasks which the farmers are supposed to carry out, based on the tasks location and scheduled time.

In this further embodiment, the method further comprises receiving farm data. In this embodiment, the method of the current disclosure may further comprise determining the at least one measurement region based on different planned or previous tasks. For example, determining the at least one measurement region based on scheduled tasks, the method of the current disclosure may determine suitable measurement regions which are located around the areas where the scheduled maintenance tasks are to be carried out which are still representative of the crop status. In this embodiment, the farmers could plan measurements ahead of time, along the itineraries from one scheduled task to another, minimally disrupting their work plan and always achieving an optimal region for carrying out the measurements. In another embodiment, the current method may further comprise determining at least one measurement region based on the areas where different scheduled tasks have been carried out. In this embodiment, the farmer may follow up on the outcome of the tasks carried out and their influence on the crop nutrient content. In another embodiment, the current method may further determine the measurement regions based on past measurements. Farm data may further comprise historic data of measurement locations 310, fertilizing applications or other agricultural practices, such that the system may be configured to determine the measurement regions 300 and/or locations 310 based on the farm data to gain further insights through the appropriate placement of a measurement region 300 and/or locations 310 which can surveille the evolution and consequences of the practices carried out, as well as discovering trends within the crop nitrogen content by considering previous measurement locations 310. In such a way, further insights can be gained for the calibration of agronomical functions f and g.

In a further embodiment, the at least one measurement region and the at least one measurement location may be further determined based on field data. Field data may comprise soil data from different regions within the agricultural field. In this further embodiment, the system may be configured to determine the at least one measurement region based on the soil data, such that the variance of the soil data can be taken into account for the determination of the nitrogen crop recommendation.

In a further embodiment, system 100 may be configured to use farm data, crop data, field data and weather data in order to determine the at least one measurement region. Farmers, when managing a farm with different fields which might present different crops, need to schedule the fertilizer applications and therefore the measurements according to the growth stage of the crop. In this embodiment, system 100 may be configured to determine a crop growth status of each of the crops present in the farming fields based on the planting date, the crop type and weather data. Weather data may comprise precipitation, sun hours, maximum and minimum daily temperatures. Based on these data, system 100 may determine measurement regions in the crops which need earlier application of fertilizer.

In a further embodiment, in order to gain further insights derived from the crop growth status, the system may further comprise a mechanistic growth model to increase the robustness of the present approach. A model is hereby understood to comprise a series of digitally constructed equations or parametrizations which can be used, upon the introduction of different values, to represent data of past, current or future events.

The present model may be generated using at least one of the data mentioned above. While the complexity of the model increases the reliability and the precision of the modeled variables, in specific cases linear models elaborated for simulating and surveilling a single quantity suffice. In an embodiment, the model may comprise past, present and predicted weather data, as well as atmospheric and environmental data and field data. Moreover, further local sensed data can be incorporated into the models as it will be made clear below. Although a model is usually understood as a set of mathematical equations, the present application is not designed to be limited to such an example and the models herein represented can be AI generated "black-box" models, wherein the use of common machine learning algorithms, like a Random Forest Model or any other non-parametric machine learning model, are envisaged. Models may be determined upon setting certain hypotheses with a great variety of tools and methods. For example, the use of convolutional neural networks (CNN) and/or the use of linear or non-linear regression models to determine the parameters and different coefficient which decide the model behavior are per se well known from the prior art and therefore will not be described in further detail herein. By using these mechanistic growth models for an agricultural field, it is expected to model the time evolution or behavior of a defined subset of field variables (e.g. in certain embodiments, plant growth and yield, nutrient presence and concentration) which have a certain relation (either expressed mathematically by means of equations modelling physical phenomena or by means of transfer functions) with respect to other parameters or variables in the model. Hence, the present method comprises determining the at least one measurement region, based on the farm, field, crop data and weather data, further comprises using a mechanistic growth model to determine a nitrogen application limit date and the at least one measurement region is further determined based on the determined limit date.

In another embodiment, determining the measurement regions comprises determining the measurement regions based on weather data or weather forecast data. When the farmers have already a planned fertilizer application, weather future conditions have to be considered since rain might affect the application of fertilizers due to leaching, while wind may be considered for spraying applications. Further, the choice of a measurement region can be improved by avoiding areas with a high water stress due to the thinning of the leaves and resulting chlorophyl concentration. Hence, determining at least one of the measurement regions well ahead in time before a series of days with adverse conditions can be planned in such a way that both the moment of the application of the fertilizer is taken into consideration, as well as the moment of carrying out the measurements.

In a further embodiment, combining the two preceding ones, a further advantage can be made apparent. In the current embodiment, when having a limit date for a fertilizer application and weather forecast data, determining the at least one measurement region may further comprise determining one measurement region based on the limit date and the weather forecast data. In this embodiment, the farmers are provided with a further advantage, in which they can plan fertilization practices which although being quite ahead will not be able to be carried away due to weather conditions.

System 100 may further comprise a dedicated Graphical User Interface as shown in FIGS. 4*a-d* which helps the user in choosing the location of the measurement regions based on the at least one region determined and proposed by the system.

The farmers, when planning to measure the crop nutrient content within their farms, might consider more than just one field for the measurement, which may or may not be located close to each other. Together with the different tasks and measures planned, the scheduling might involve a full day and several kilometers. Hence, it is a further aim of the current disclosure to improve the scheduling and planning of the farm general tasks, while achieving a more reliable measurement which further allows a more reliable fertilizer recommendation.

In an embodiment as shown in FIGS. 4*a-d*, the current system may be an input unit and output unit combined as a touch sensitive display. However, while the system 100 is of a mobile nature, the Graphical User Interface envisaged for the current system might be as well run on a laptop or desktop electronic device at the farm in preparation of the daily activities. Hence, the scope of the application for the current Graphical User Interface is not only limited to mobile devices. Throughout the disclosure, the system being configured to display is meant to be by means of a dedicated Graphical User Interface displayed by means of the display unit.

The farmers, when planning to carry out the at least one measurement, may first select at least one field from a plurality of fields belonging to his farm. The fields may comprise crops of the same or different type. System 100 may be configured to display the at least one field determined for carrying out the at least one measurement. System 100, when displaying the at least one field may further display the location 30 of the farmers if in the view. System 100 may further display by means of the Graphical User Interface, when the farmer is not on the displayed view due to scale or to the actual position of the farmer, an icon 40 representative of the relative location of the farmers. In this embodiment, icon 40 defining the farmers relative location may be then represented on a margin area of the display, wherein the relative position of the farmers is given by indicating the relative direction leading to the farmer. Icon 40 may further comprise further indices which indicate the distance and identity of the farmers to the currently displayed at least one field.

System 100, when displaying the at least one measurement region 300 within the field, may display several of these regions which are suitable for carrying out the measurements. System 100 may further display scheduled tasks 330 within the field, providing the user with further information for choosing the most convenient measurement region amongst the ones determined by the system 100. System 100, when displaying scheduled tasks 330, as represented in FIG. 4*b*, may further display an icon representative of the task to be carried out, as well as any further data which might be related to the task (appointment with external actors, scheduled time, completion details of the task) for further planning. The system 100 may be further configured to display in the Graphical User Interface further field, farm and weather data which are related to the scheduled tasks. For example, farmers may be intending to spread solid fertilizers or urea pills or may as well intend to use liquid sprays. Decision making process in order to schedule those tasks is highly weather dependent. The farmers, when selecting the at least one measurement region may further be provided with the display of weather data and indicators of the suitability to carry out determined actions based on the time and the weather forecast data, crop and/or field data associated to the at least one measurement region. As such, the farmers may schedule both the measurement action, as well as the intended agricultural practice in a time optimal manner which integrates in the daily activities of the field without disrupting any of the scheduled tasks. For example, if a task is scheduled at a given time and cannot be shifted due to a fixed appointment with an external advisor or actor, and if the weather conditions are not suitable for carrying out the intended application of the fertilizer or any other agricultural product comprised in the daily scheduled tasks, the system of the current disclosure may be configured to determine the measurement region, the needed itineraries in between different regions and scheduled tasks, and the scheduling of the subsequent tasks to be carried out on the determined field. For example, the system of the current disclosure may be configured to display alternative routes and measurement regions which link the scheduled tasks, offering the user different itineraries which include, at least a measurement region determined to any of the above-mentioned embodiments, and at least one of the scheduled tasks 330. As such, the farmers can choose from the proposed measurement regions, if more than one available, having weather and farm data into consideration, allowing the farmers to schedule accordingly their day, while achieving the determination of at least one suitable measurement region to carry out the measurements, as it can be seen in FIG. 4*c*.

In a further embodiment, the system may be further configured to receive an input which selects at least one of the scheduled tasks. Based on the location of the scheduled tasks selected, the system may be further configured to determine at least a measurement region which is suitably located to establish an itinerary which includes the at least one measurement region and the selected scheduled tasks.

Further, as explained above, the Graphical User Interface may further comprise determining at least one of the measurement regions based on the fertilizer application date. Hence, one of the proposed measurement regions would be shown among the different regions proposed with an alert which would draw the attention of the farmer to the convenience of taking a measurement at a certain field, within the plurality of fields and determining the region within that field according to the above discussed embodiments.

In a further embodiment, where the method of the current disclosure is configured to determine a sub-area within the agricultural field where the measurement region should be contained, the Graphical User Interface may further be configured to receive an input from the users, whereby the users are able of determining at least one predetermined area or sub-area of the agricultural field where the system is configured to determine the at least one measuring region. The system may be configured, by means of the Graphical User Interface, to allow the users to draw or create by means of a lasso selection tool the at least one predetermined area or sub-area. Following this embodiment, the users are allowed to determine specific areas within the agricultural field where they are going to be, or pass through, or which are more convenient for them due to the presence of scheduled tasks or further tasks the farmers should carry out in the agricultural field.

In a further embodiment, the method of the current disclosure is configured to determine the at least one measurement region based on the distance to at least a first and/or at least one second predetermined location.

In a further embodiment, the at least one first and/or the at least one second predetermined locations are at least one of the following: a position within a tramline track on the agricultural field, a boundary region of the agricultural field, the position of the farmer, the position of a sensor in the agricultural field, the position of a scheduled task on the agricultural field, a previous sampling position on the agricultural field, and an entrance gate to the agricultural field.

The advantages of said embodiments will be made clear ahead. Usually, geographical barriers or the lack of existence of specific connections within specific areas of fields or between different fields may render cumbersome for the farmers to move from specific regions of the farms and/or agricultural fields to other specific regions. For example, certain agricultural fields are fenced and have a unique point of entry. As such, certain areas can be prioritized by determining a distance from the entry gate to the at least one measurement region. Other agricultural fields which lack said unique point of entry may be referred to their boundaries for establishing the reference distances. While crop status at the boundary may lead to inaccuracies due to the problematics associated with them (lack of appropriate fertilization due to strict local regulations, insufficient information from remote sensing due to the boundaries) and the nearest regions to them should be avoided, it is always of convenience for the farmers to determine a measurement region which is easily accessible from one field boundary. As such, the method may be configured to determine the suitable at least one first and at least one second measurement regions which are as close as possible to any of the boundaries while maintaining a minimum distance from them.

Figure 4D:
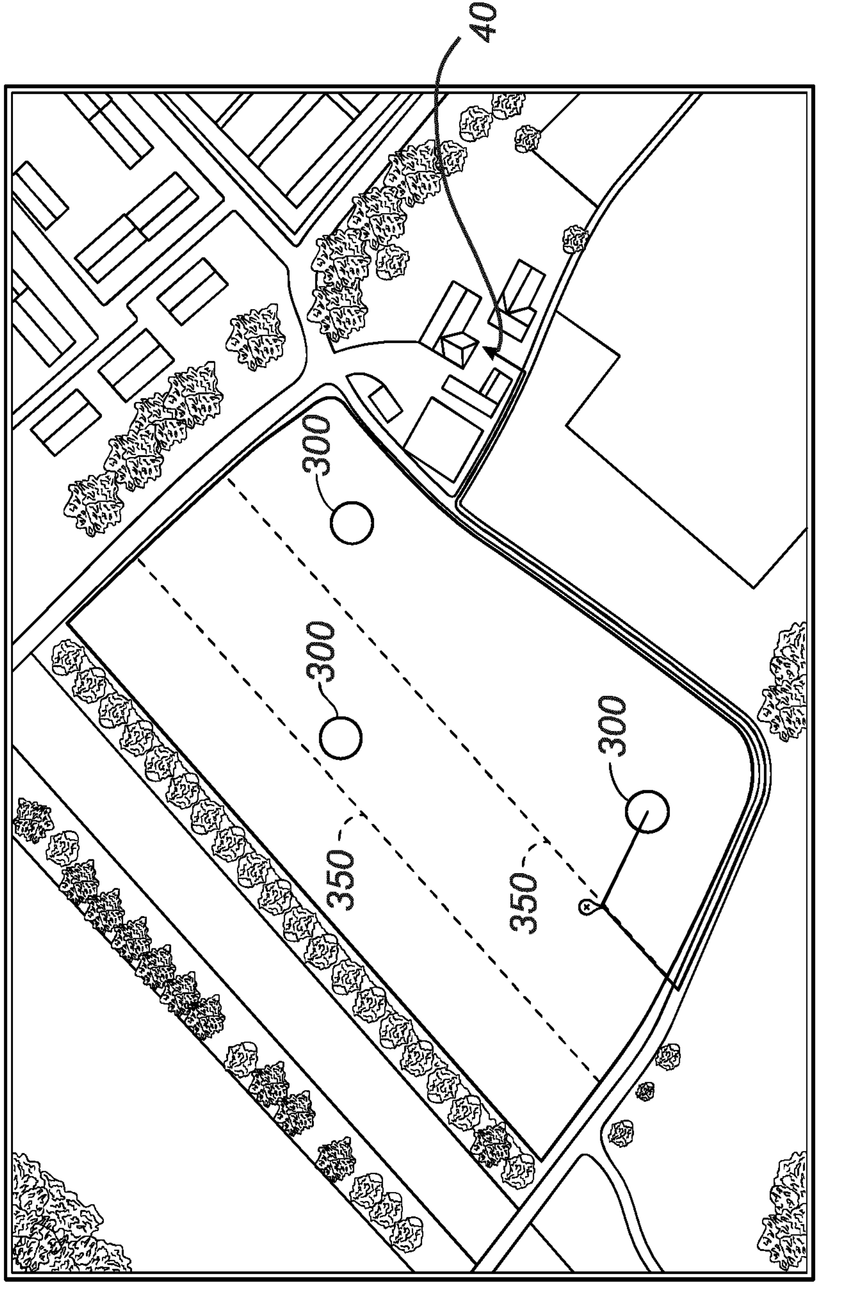

As it is to be seen in FIG. 4*d*, in another embodiment, the method of the current disclosure is further configured to determine the existence and location of tracks or trails 350 within the agricultural field and determine the at least one first and at least one second measurement regions based on a distance from the determined tracks or trails within the agricultural field. In certain crops, the use of machinery for specific purposes leaves tracks which remain over the whole crop season and/or over several seasons. Apart from the obvious reasons for transport facilities, soil in these tracks is compacted over time and is easily to drive or walk through and the determination of access routes by means of these tracks is advantageous for the farmers.

The method being configured to determine the existence and location of track or tramlines may comprise at least one of receiving gps data from agricultural machinery 200 from previous operations in the agricultural field, automatic determination from remote imagery and/or by means of user input. The farmers may therefore use input unit 140 by means of a dedicated Graphical User Interface to determine the existence and location of tracks or trails present in the agricultural field. Once the method of the current disclosure has determined the existing tracks or trails, the method is further configured to determine a distance from the at least one first and/or the at least one second measurement region to the determined tracks or trails if any and determining the at least one first and/or the at least one second measurement region which are closest to the track or trail.

Hence, the first and/or the second predetermined locations can be one of the following: the current position of the farmer as determined by the positional data of the communications unit, a predetermined location as determined by the user by means of the input unit, a specific location as given by field and or farm data: i.e. the location of the farm's entrance gate, a specific location where a planned task like maintenance of an agricultural piece of equipment or any in-site visit to the farm is scheduled, the position of a sensor in the agricultural field, a position within the farm boundary or within a track or trail of the agricultural field and/or a previous sampling position on the agricultural field.

Figure 5:
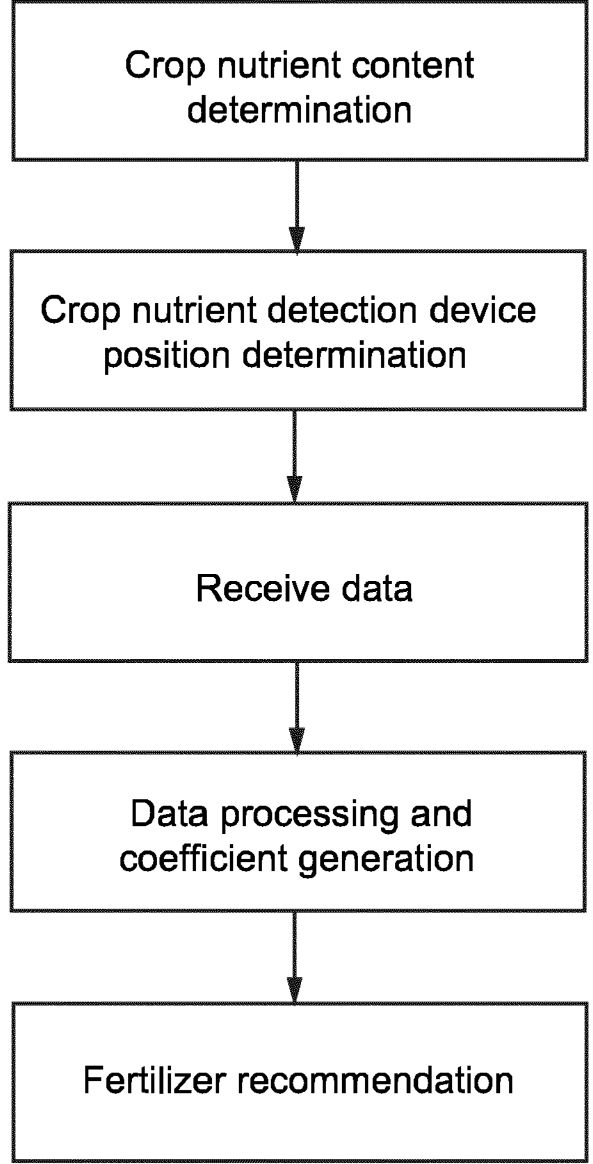
FIGS. 5 and 6 show workflows of two of the embodiments of the present disclosure.
Figure 6:
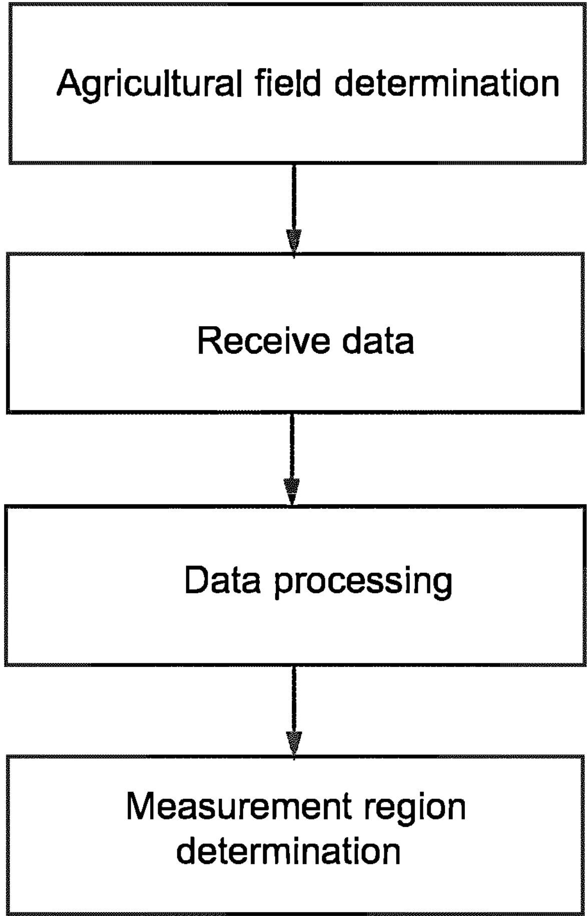

FIGS. 5 and 6 show workflows of two methods representing respective embodiments of the present disclosure. Although the process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product. While the foregoing describes various embodiments of the disclosure, other and further embodiments of the disclosure may be devised without departing from the basic scope thereof. The scope of the disclosure is determined by the claims that follow. The disclosure is not limited to the described embodiments, versions or examples, which are included to enable a person having ordinary skill in the art to make and use the disclosure when combined with information and knowledge available to the person having ordinary skill in the art.

While the present disclosure has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The disclosure in its broader aspects is therefore not limited to the specific details, representative apparatus and method, and illustrative example shown and described Accordingly, the detailed description thereof should not be construed as restrictive in all aspects but considered as illustrative. The scope of the disclosure should be determined by reasonable interpretation of the appended claims and all changes that come within the equivalent scope are included in the scope of the current disclosure.

LIST OF REFERENCE SIGNS

10 Plant leaf
20 Agricultural field
30 Farmers location
40 Farmers location icon
100 System
110 Crop nutrient detection device
120 Communication unit
130 Display unit
135 Touch sensitive display
140 Input unit
150 Location unit
170 Crop/Farm sensors
180 Weather station
200 Agricultural apparatus 210 Agricultural recommendation engine
250 Remote imaging satellite
260 Manned or unmanned imaging aerial vehicles
300 Measurement regions
310 Measurement locations
320 Measurement path
330 Scheduled tasks

The invention claimed is:

1. A method for providing a fertilizer recommendation for a crop with a handheld system comprising a crop nutrient detection device, wherein the method comprises steps of:

i) determining a crop nutrient content by carrying out at least a measurement $M_j$ by means of the crop nutrient detection device in at least one measurement location $(x_j, y_j)$ within an agricultural field;

ii) determining a crop nutrient detection device position at the at least one measurement location;

iii) receiving data, wherein receiving the data comprises receiving field data of the agricultural field and receiving remote spectral data from at least a plurality of wavelengths of the agricultural field;

iv) processing the data to obtain at least one coefficient indicative of a crop status within the agricultural field;

v) generating the fertilizer recommendation for the crop within the agricultural field based on the determined crop nutrient content, the determined position of the crop nutrient detection device and the at least one coefficient indicative of the crop status within the agricultural field, wherein the fertilizer recommendation for a given location $N_{REC}(X_i, y_i)$ based on a plurality of measurements M at locations $(x_j, y_j)$ is defined by the following equation:

$$N_{REC}(x_i, y_i) = f(M(x_j, y_j)) + C^* g[R(x_i, y_i) - R_0],$$

wherein f represents an agronomic calibration function that translates an at least one measurement value of the crop nutrient detection device into a baseline value fertilizer recommendation; g represents an agronomic calibration function that translates a value R of the at least one generated coefficient at $(x_i, y_i)$ into a respective location dependent fertilizer recommendation, R represents the value of the at least one coefficient or a combination thereof considered at position $(x_i, y_i)$, and C and $R_0$ represent calibration constants; and vi) transmitting the fertilizer recommendation to one or more agricultural machines used to perform one or more fertilizing operations within the agricultural field.

2. The method according to claim 1, wherein generating the fertilizer recommendation comprises using the determined crop nutrient content in the at least one location as baseline value for the agricultural field, and adjusting the fertilizer recommendation at a given location of the agricultural field based on the value of the at least one coefficient in the given location.

3. The method according to claim 1, wherein receiving the data further comprises receiving farm and/or weather data, and generating a fertilizer recommendation for the crop within the agricultural field further comprises adjusting the fertilizer recommendation based on at least one of the received field, farm and/or weather data.

4. The method according to claim 1, wherein the fertilizer recommendation is used for controlling the one or more agricultural machines to perform one or more fertilizing operations within the agricultural field.

5. The method according to claim 1, wherein receiving remote spectral data further comprises receiving temporal series of the remote spectral data.

6. A system for providing a fertilizer recommendation comprising a crop nutrient detection device and a mobile communication unit, configured to carry out the method according to claim 1.

7. The method according to claim 1, wherein determining the crop nutrient detection device position at the at least one measurement location is determined by receiving location data from a location unit of the crop nutrient detection device.

8. A computer implemented method for determining at least one measurement region for carrying out at least one measurement with a crop nutrient detection device for providing a fertilizer recommendation to a crop, comprising steps of:

i) determining an agricultural field comprising the crop for which the recommendation is intended by receiving location data from a location unit of the crop nutrient detection device or a user input;

ii) receiving data, wherein receiving the data comprises receiving field data of the agricultural field and receiving remote spectral data from at least a plurality of wavelengths of the agricultural field;

iii) processing the data to obtain at least a coefficient indicative of a crop status within the agricultural field;

iv) determining at least one measurement region within the agricultural field for carrying out the at least one measurement based on the data and the at least one coefficient;

v) displaying, on a display unit, the at least one measurement region within the agricultural field for carrying out the at least one measurement based on the data; and vi) receiving the at least one measurement from the crop nutrient detection device within the at least one measurement region.

9. The method according to claim 8, wherein determining at least one measurement region further comprises determining at least one measurement location within the measurement region.

10. The method according to claim 8, wherein determining at least one measurement region based on the at one coefficient further comprises determining a region wherein a value R of the at least one coefficient or a combination thereof is comprised within a range of at least one of the following: $0.7\ R_{Avg}<R<0.85\ R_{Avg}$, or $0.85\ R_{Avg}<R<1.15\ R_{Avg}$, or $1.15\ R_{Avg}<R<1.3\ R_{Avg}$, wherein $R_{Avg}$, is defined as an average value within the agricultural field of the at least one coefficient.

11. The method according to claim 8, wherein receiving field data further comprises receiving geographic identifiers regarding geometry of boundaries of the agricultural field, and wherein determining the at least one measurement region within the agricultural field further comprises determining the at least one measurement region based on the field data.

12. The method according to claim 8, wherein the crop nutrient detection device comprises a location unit and the method further comprises receiving location data from the crop nutrient detection device and determining the at least one measurement region based on the location data.

13. The method according to claim 8, wherein the method further comprises receiving crop data and weather data, wherein determining the at least one measurement region within the agricultural field further comprises determining the at least one measurement region based on the crop and weather data.

14. The method according to claim 8, wherein the method further comprises receiving weather forecast data and wherein determining the at least one measurement region within the agricultural field further comprises determining the at least one measurement region based on the weather forecast data.

15. The method according to claim 8, wherein the method further comprises determining a sub-area within the agricultural field, where the at least one measurement region should be contained.

16. The method according to claim 8, wherein the method further comprises receiving farm data and determining the measurement region based on the farm data.

17. The method according to claim 8, wherein the method further comprises determining a crop nutrient content in at least one of the measurement regions and generating the fertilizer recommendation.

18. A system for determining at least one measurement region for carrying out at least one measurement with a crop nutrient detection device for providing a fertilizer recommendation to a crop, comprising:

a display unit;

an input unit;

wherein the system comprises a processor configured to carry out a process comprising steps of:

determining an agricultural field comprising the crop for which the recommendation is intended by receiving location data from a location unit of the crop nutrient detection device or a user input to the input unit;

receiving data, wherein receiving the data comprises receiving field data of the agricultural field and receiving remote spectral data from at least a plurality of wavelengths of the agricultural field;

processing the data to obtain at least a coefficient indicative of a crop status within the agricultural field;

determining at least one measurement region within the agricultural field for carrying out the at least one measurement based on the data and the at least one coefficient;

displaying, via the display unit, the at least one measurement region; and receiving the at least one measurement from the crop nutrient detection device within the at least one measurement region.

19. The system according to claim 18, wherein the display and the input unit are comprised in a Graphical User Interface configured to display the at least one measurement region.

20. The system according to claim 19, wherein the graphical user interface is further configured to display a plurality of measurement regions and the system is further configured to receive an input for selecting at least one from the at least one of the plurality of measurement regions displayed.

21. The system according to claim 18, wherein the system is further configured to display weather forecast data, crop and/or field data associated with the at least one measurement region.

22. The system according to claim 18, wherein the system is further configured to receive farm data and display at least one scheduled task, wherein the system is further configured to display the at least one measurement region, and different itineraries which include the at least one measurement region and at least one of the scheduled tasks displayed.

23. The system according to claim 19, wherein the system is further configured to receive an input for determining at least one predetermined area of the agricultural field and the system is further configured to determine the at least one measurement region within the at least one predetermined area.

* * * * *